Feb. 6, 1940.  W. L. McGRATH  2,189,381
TEMPERATURE REGULATING SYSTEM
Filed Jan. 13, 1936  3 Sheets-Sheet 1

Fig. 1
Fig. 2

Inventor
William L. McGrath
By George H. Fisher
Attorney

Fig. 3

Patented Feb. 6, 1940

2,189,381

UNITED STATES PATENT OFFICE 2,189,381

TEMPERATURE REGULATING SYSTEM

William L. McGrath, Minneapolis, Minn., assignor to Minneapolis-Honeywell Regulator Company, Minneapolis, Minn., a corporation of Delaware Application January 13, 1936, Serial No. 58,867

11 Claims. (Cl. 236—9)

This invention relates to temperature regulating systems, and more particularly to that type of system for controlling the temperature of a space.

Conventional heating systems using space thermostats of the "on and off" type for controlling a heater for heating a space, supply heat at a substantially full capacity to the space upon a call for heat by the space thermostat, and supply substantially no heat to the space when the space thermostat is satisfied. Due to this intermittent supply of large amounts of heat to the space, and due to the inherent lag or inertia of such systems, "overshooting" and "undershooting" of the space temperature is brought about.

It is known that by maintaining the temperature of the heating medium at a predetermined value so as to supply just the correct amount of heat to the space to satisfy the heating load of the system, the space temperature may be maintained at a desired value. Specifically, it is known that upon an increase in the heating load the temperature of the heating medium may be increased to supply additional heat to the space to maintain the space temperature constant. Conversely, upon a decrease in the heating load the temperature of the heating medium may be decreased to supply less heat to maintain the space temperature at the desired value.

It is the prime object of my invention to provide a means for adjusting the temperature of the heating medium in accordance with the heating load on the system to maintain the space temperature at a desired value in such a manner as to prevent "overshooting" and "undershooting" of the space temperature.

More specifically, it is an object of this invention to provide a means for intermittently adjusting the temperature of the heating medium in a step-by-step manner, whereby the temperature of the heating medium may be gradually brought to the desired value without causing the temperature thereof to rise above the desired value or to lower below the desired value.

Still more specifically, it is an object of this invention to provide a condition responsive means for maintaining the temperature of the heating medium at a desired value to supply sufficient heat to a space to maintain the space temperature at the desired value, along with means for raising in a step-by-step manner the setting of the condition responsive device to increase the temperature of the heating medium in accordance with an increase in the heating load and for lowering the setting of the condition responsive device for lowering the temperature of the heating medium in response to a decrease in the heating load.

The regulating system is so arranged that the adjustment of the setting of the condition responsive means cannot be made faster than the recovery of the heating system to this adjustment or that the temperature of the heating fluid cannot increase or decrease faster than the rate of adjustment of the condition responsive means. This mode of operation and the manner in which it is accomplished also form objects of this invention.

It is another object of this invention to provide means for adjusting a boiler thermostat at one rate of speed when the space temperature deviates from normal a given amount and for adjusting the boiler thermostat at another rate of speed when the space temperature deviates from normal a greater amount in order to provide a normal, accurate temperature control of the space and to provide a rapid restoring of the temperature of the space to normal when the temperature of the space deviates a relatively great amount from normal.

Still another object of this invention is to provide a thermostat of novel construction which may be utilized in my invention.

Other objects and advantages will become apparent to those skilled in the art upon reference to the accompanying specification, claims and drawings, in which drawings:

Figures 1, 2:
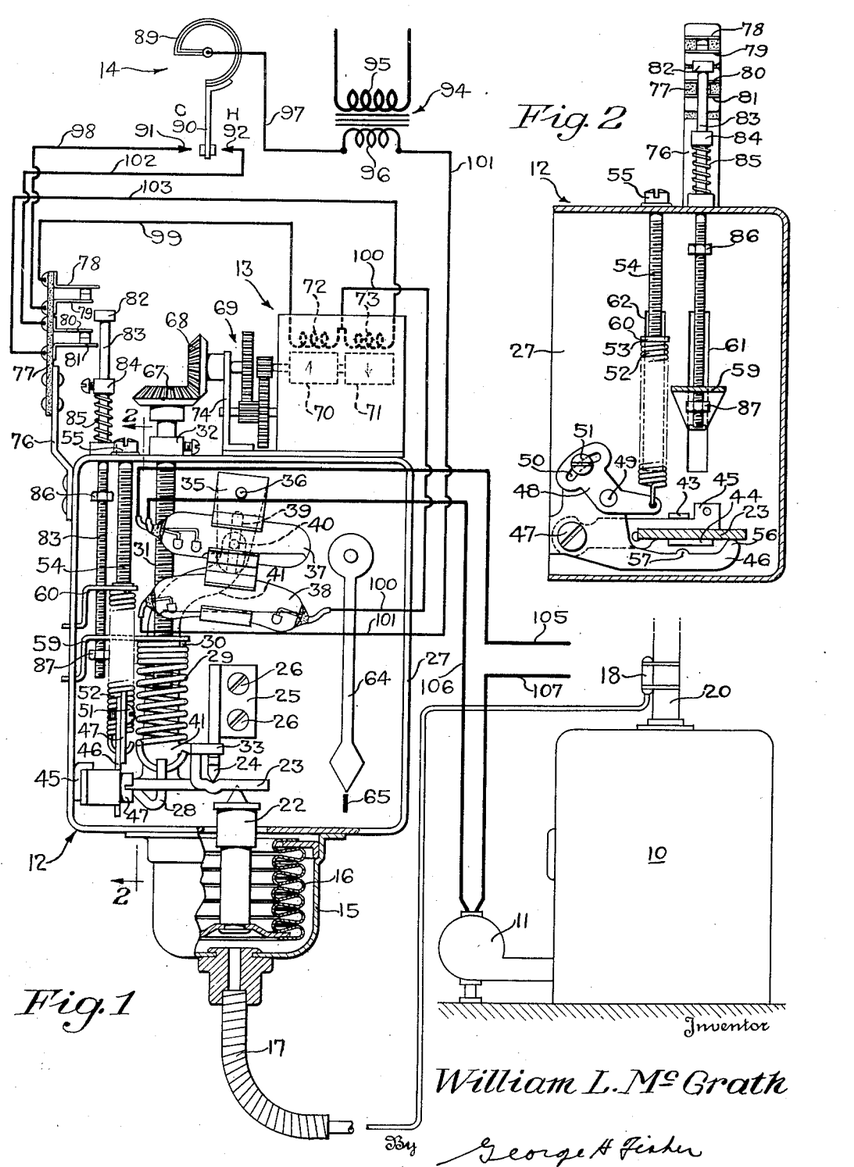
Figure 1 diagrammatically illustrates one form of my invention.
Figure 2 is a sectional view taken on the line 2—2 of Figure 1.

Referring now to Figure 1 of the drawings, a heating means for a space is illustrated at 10 and this heating means is shown to comprise a boiler for purposes of illustration, although any other form of heating means may be utilized. The heating means 10 is shown to be heated by an oil burner 11, although any other type of firing means may be utilized. The oil burner 11 is controlled by a device responsive to the condition of the heating means 10 and may take the form of a boiler thermostat generally designated at 12, although this instrument may equally as well be a pressure responsive device. The setting of the boiler thermostat 12 is adjusted by means of an adjusting motor generally designated at 13, and this adjusting motor is in turn controlled by a space thermostat generally designated at 14.

The boiler thermostat 12 includes a housing 15 in which is mounted an expansible bellows 16, the arrangement being such that a pressure chamber is formed between the housing 15 and the bellows 16. This chamber is connected by means of a capillary tube 17 which in turn is connected to a bulb 18 located in intimate contact with the heating fluid of the heating means 10, and, as shown in the drawings, it is attached to the riser 20 leading from the heating means 10 to the space to be heated. The bulb 18 is charged with a volatile fluid so that upon an increase in temperature of the heating fluid the volatile fluid is vaporized to cause upward movement of a plunger 22 carried by the expansible bellows 16.

The plunger 22 is adapted to engage a lever 23 pivoted upon a knife edge 24 carried by a bracket 25. The bracket 25 may be secured by means of screw 26 to the casing 27 of the boiler thermostat. The lever 23 is provided with a projection 28 to which is secured one end of tension spring 29, the other end thereof being secured to a nut 30 which is mounted upon a screw 31. The screw 31 is held against longitudinal movement by a collar 32 abutting against the upper surface of the casing 27. The tension spring 29 is adapted to rotate the lever 23 in a clockwise direction about the knife edge 24 and the plunger 22 is adapted to rotate the lever 23 about the knife edge 24 in a counter-clockwise direction upon an increase in the temperature of the heating fluid. A lug 33 overlying the knife edge 24 is provided on the lever 23 to maintain the parts in an assembled position.

Pivotally mounted in the casing 27 of the boiler thermostat 12 is a mercury switch carrier clip 35 pivoted as at 36. The mercury switch carrier 35 carries mercury switches 37 and 38, the function of which will be pointed out more fully hereafter. The mercury switch carrier is provided with a slot 39 which is adapted slidably to receive a pin 40, the pin 40 being carried by an upwardly extending extension 41 of the pivoted lever 23. The arrangement is such that upon an increase in heating fluid temperature the mercury switch carrier is tilted in a clockwise direction and upon a decrease in temperature the mercury switch carrier is tilted in a counter-clockwise direction. As is seen in Figure 1, the mercury switch 37 is moved to a circuit making position upon a decrease in heating fluid temperature and to a circuit breaking position upon an increase in heating fluid temperature. The mercury switch 38 is so arranged that it makes contact when it is in a horizontal position or slightly on either side of the horizontal position and it is so arranged with respect to the mercury switch 37 that it is in a circuit making position when the mercury switch 37 is at or near a horizontal position.

Referring now to Figure 2, it is seen that clockwise movement of the lever 23 is limited by an upper stop 43 and that counter-clockwise movement of the lever 23 is limited by means of a lower stop 44, the stops 43 and 44 being carried by a bracket 45 suitably mounted on the casing 27. A lever 46 is also pivoted on the bracket 45 as at 47, and carries a pivot 49 to which is secured a second lever 48. The second lever 48 is held in an adjusted position with respect to the first lever 46 by means of a screw 51, the adjustment being permitted by the slot 50 in the second lever 48. The second lever 48 is secured to one end of a tension spring 52, the other end thereof being secured to a nut 53 mounted on a screw 54 which is held against longitudinal movement by the screw head 55. The spring 53 therefore urges the lever 46 in a counter-clockwise direction. The lever 46 carries an abutment 56 which is adapted to engage the lower surface of the lever 23 and the lever 46 also carries an abutment 57 which is adapted to engage the undersurface of the lower stop 44.

Assume that the parts are in a position wherein the lever 23 engages the lower stop 44 and therefore the mercury switches 37 and 38 are tilted in an extreme clockwise position. The mercury switches 37 and 38 will therefore be in circuit breaking positions. Upon a decrease in boiler temperature the springs 29 and 52 move the lever 23 in a clockwise direction away from the lower stop 44, and when this movement has been halfway completed the abutment 57 engages the lower stop 44 to prevent further actuation of the lever 23 by the spring 52. When the parts are moved to this position the switches 37 and 38 are moved to a substantially horizontal position wherein contact is established between the electrodes of the mercury switch 38 but wherein contact is not established between the electrodes of mercury switch 37 by reason of the angle of lag of the switch 37. Since the spring 52 no longer actuates the lever 23, a greater temperature drop is required to allow the spring 29 to continue the clockwise movement of the lever 23 into engagement with the upper stop 43. When the lever 23 is moved into engagement with the upper stop 43 the switches 37 and 38 are moved to an extreme counter-clockwise position wherein a circuit through the mercury switch 37 is established and the circuit through the mercury switch 38 is broken. Upon an increase in temperature the plunger 22 is moved upwardly to move the lever 23 in a counter-clockwise direction against the tension of the spring 29 away from the upper stop 43. When the lever 23 has travelled substantially halfway, it engages the abutment 56 of the lever 46 and therefore further movement of the lever 23 is restrained by the spring 52. Movement of the lever 23 to this midposition causes movement of the mercury switches 37 and 38 to their horizontal positions, whereby contact is established in the mercury switch 38, and contact remains established in the mercury switch 37 by reason of the angle of lag of the mercury switch 37. In order to move the lever 23 to its extreme counter-clockwise position the bellows 16 must not only overcome the spring 29 but must also overcome the spring 52 operating through the lever 46 whereby an increased load is placed upon the bellows 16. When the temperature has risen sufficiently to overcome this increased load the lever 23 is moved against the lower stop 44 and the mercury switches are moved to their extreme clockwise position to break the circuits established through the mercury switches 37 and 38. In this manner the differential of pressure required to move the lever 23 from the upper stop 43 to the lower stop 44, and vice versa, from the lower stop 44 to the upper stop 43, is increased and the amount of increase in differential may be adjusted by adjusting the tension of the spring 52.

It is therefore seen that when the mercury switches 37 and 38 are moved to a substantially horizontal position, contact is established in the mercury switch 38 and contact may or may not be established in the mercury switch 37 depending upon which way the mercury switch 37 is moving.

The nut 30 associated with the tension spring 29 and the nut 53 associated with the tension spring 52 are provided with pointers 59 and 60 respectively, which extend outwardly through slots 61 and 62 respectively in the casing 27. Pointers 59 and 60 cooperate with indicia located on the casing 27 to indicate the tension in the springs 29 and 52 respectively in terms of temperature and also serve the purpose of holding the nuts 30 and 53 against rotation so that rotary movement of the screws 31 and 54 causes longitudinal movement of the nuts 30 and 53 respectively. In this manner rotation of the screw 31 adjusts the temperature setting of the boiler thermostat and rotation of the screw 54 adjusts the differential of operation of the boiler thermostat.

In order to insure proper alignment of the boiler thermostat and therefore proper operation of the mercury switches 37 and 38, a pendulum 64 is mounted in the casing 27 and is adapted to coact with a mark 65, whereby the instrument may be properly levelled.

The screw 31 for adjusting the temperature setting of the boiler thermostat 12 carries a bevelled gear 67 which meshes with another bevelled gear 68 which is driven through a reduction gear train 69 by motor rotors 70 and 71 upon energization of field windings 72 and 73. The various gears are suitably supported by a support 74 mounted on the casing 27. The arrangement is such that when the field winding 72 is energized the screw 31 is rotated to increase the tension in the spring 29, whereby the temperature setting of the boiler thermostat 12 is increased. Conversely, energization of field winding 73 causes reverse rotation of the screw 31 to decrease the tension in the spring 29, whereby the temperature setting of the boiler thermostat 12 is decreased.

Suitably mounted on the casing 27 is a bracket 76 which carries a strip of insulating material 77. Mounted upon the strip of insulating material 77 are contacts 78, 79, 80 and 81, the contacts 78 and 79 being normally in engagement and the contacts 80 and 81 also being normally in engagement. Located between the contacts is an abutment 82 carried by a rod 83. Mounted on the rod 83 is a collar 84 which is engaged by a spring 85 to maintain the abutment 82 spaced midway between the contacts 78 and 81. The rod 83 extends downwardly into the casing 27 and through an opening in the indicating arm 59. The rod 83 is screw threaded and is provided with spaced abutments 86 and 87 which are adapted to be engaged by the indicating arm 59 at either extreme position thereof. The arrangement is such that when the temperature setting of the boiler thermostat 12 is raised to its maximum value the arm 59 engages the abutment 86 to move the abutment 82 into engagement with the contact 78 to break contact between the contacts 78 and 79. Likewise, when the temperature setting of the boiler thermostat is adjusted to its lowest value the indicating arm 59 engages the abutment 87 to move the abutment 82 into engagement with the contact 81 to break contact between the contact 80 and 81. The contacts 78, 79, 80 and 81 therefore form limit switches, the operation of which will be more fully pointed out hereafter.

The space thermostat, generally designated at 14, may comprise a bimetallic element 89 for carrying and operating a switch arm 90 which cooperates with spaced contacts 91 and 92. The arrangement is such that upon a decrease in space temperature the switch arm 90 is moved as indicated by the character C into engagement with the contact 91, and upon an increase in space temperature the switch arm 90 is moved in the direction indicated by the character H into engagement with the contact 92.

A step-down transformer is generally designated at 94 and comprises a primary 95 suitably connected to a power source, not shown, and a secondary 96. One end of the secondary 96 is connected by a wire 97 to the bimetallic element 89 of the space thermostat 14. The contact 91 of the space thermostat 14 is connected by a wire 98 to the limit switch contact 79 and the associated limit switch contact 78 is connected by a wire 99 to one end of the field winding 72. The other end of the field winding 72 is connected by a wire 100 to one of the electrodes of the mercury switch 38. The other electrode of the mercury switch 38 is connected by a wire 101 to the other end of the secondary 96. The contact 92 of the space thermostat 14 is connected by wire 102 to the limit switch contact 80, and the associated limit switch contact 81 is connected by a wire 103 to one end of the field winding 73. The other end of the field winding 73 is connected to the junction of field winding 72 and the wire 100. A wire 105 leading from some source of power, not shown, is connected to one of the electrodes of the mercury switch 37 and the other electrode thereof is connected by wire 106 to the oil burner 11. The oil burner 11 is in turn connected by a wire 107 to the source of power, not shown, the arrangement being such that when the mercury switch 37 is moved to a circuit making position a circuit is completed to cause operation of the oil burner 11.

With the parts in the position shown in the drawings, the space temperature is at the desired value and consequently the switch arm 90 is midway between the contacts 91 and 92. The boiler thermostat is in such position as to maintain the mercury switch 37 in a circuit open position, whereby the oil burner 11 is non-operative. These positions result from the fact that the temperature of the heating fluid in the boiler 10 is at such a value as to supply the correct amount of heat to the space to maintain the space temperature at the desired value. Upon a decrease in boiler temperature the mercury switch 37 is moved to a circuit making position to cause operation of the oil burner 11 to restore the temperature of the heating fluid in the boiler 10 to the desired value. In this manner the oil burner 11 is intermittently operated to maintain the temperature of the boiler water at the desired value. The amount of operation of the oil burner is determined by the setting of the differential adjusting means, and the temperature of the boiler water is determined by the setting of the boiler thermostat 12.

Upon an increase in the heating load which may be caused by an increase in heat loss from the space, the switch arm 90 of the thermostat 14 is moved into engagement with the contact 91 to complete a circuit from the secondary 96 through wire 97, bimetallic element 89, switch 76 arm 90, contact 91, wire 98, limit switch contacts 78 and 79, wire 99, field winding 72, wire 100, mercury switch 38, and wire 101, back to the secondary 96. This causes energization of the field winding 72 to increase the tension in the spring 29, whereby the temperature setting of the boiler thermostat 12 is increased. This increase in the tension of spring 29 causes movement of the mercury switch 37 to a circuit making position to cause energization of the oil burner 11 to cause heating of the heating fluid in boiler 10. As the mercury switch 37 is moved to a circuit making position the mercury switch 38 is moved to a circuit breaking position to break the circuit through the field winding 72, whereby further raising of the setting of the boiler thermostat 12 is prevented. Due to the operation of the oil burner 11 the temperature of the boiler water is increased and when the temperature of the boiler water has increased sufficiently, the mercury switch 37 is moved toward a horizontal position, the oil burner still being in operation, and the mercury switch 38 is moved to a circuit making position. This increase in boiler temperature supplies additional heat to the space to be heated, but if the space thermostat 14 is still calling for heat the above mentioned circuit through the field winding 72 is again completed to cause a further raising of the setting of the boiler thermostat 12. In this manner the setting of the boiler thermostat 12 is increased upon a call for heat by the space thermostat 14 in a step-by-step manner, until such time as the space thermostat shall become satisfied.

If the heating load should decrease, as caused by an increase in outdoor temperature or by the congregation of a large number of people in the space, the space temperature will increase to move the switch arm 90 into engagement with the contact 92 to complete a circuit from the secondary 96 through wire 97, bimetallic element 89, switch arm 90, contact 92, wire 102, limit switch contacts 80 and 81, wire 103, field winding 73, wire 100, mercury switch 38, and wire 101, back to the secondary 96. Completion of this circuit causes energization of the field winding 73 to decrease the tension of the spring 29, which lowers the setting of the boiler thermostat 12. Decrease in the tension of the spring 29 in this manner causes clockwise movement of the mercury switch carrier 35 to move the mercury switch 38 to a circuit breaking position, whereby further downward adjustment of the boiler thermostat 12 is prevented. This decreasing of the tension in the spring 29 also moves the mercury switch 37 toward a circuit breaking position. When the temperature of the heating fluid in the boiler 10 decreases by reason of the oil burner 11 being de-energized, the mercury switch carrier 35 is moved in a counter-clockwise direction to move the mercury switches to a horizontal position, whereby mercury switch 38 is moved to a circuit making position but the mercury switch 37 remains in a circuit breaking position. If the space temperature is still above the desired value and the switch arm 90 is in engagement with the contact 90, the circuit through the field winding 73 is again reestablished to further decrease the tension in the spring 29 and further lower the setting of the boiler thermostat 12. The setting of the boiler thermostat 12 will be continued to be lowered in this manner until such time as the space temperature is restored to normal and the switch arm 90 remains spaced midway between the contacts 91 and 92.

By reason of this construction it is seen that the temperature of the boiler is maintained at such a value as to supply the correct amount of heat to the space to maintain the space temperature constant, and that upon changes in the heating load either upwardly or downwardly the boiler thermostat is adjusted in a step-by-step manner, whereby accurate adjustment of the boiler thermostat is obtained and "overshooting" and "undershooting" of the space temperature is prevented. By reason of the step-by-step action the adjustment of the boiler thermostat and the temperature of the boiler water are so interlocked that the boiler thermostat cannot be adjusted faster than the recovery of the heating system to this adjustment and that the boiler water temperature cannot be changed faster than the rate of adjustment of the boiler thermostat.

The limit switches 78, 79, 80 and 81 located in series with the field windings 72 and 73 respectively, limit the adjustment either upwardly or downwardly of the boiler thermostat 12 and these limits may be so selected that the boiler water temperature cannot rise above a predetermined value and cannot decrease below a predetermined lower value. It therefore follows that by reason of this construction the usual high limit switch is done away with and that a low limit control is provided.

Figure 3:
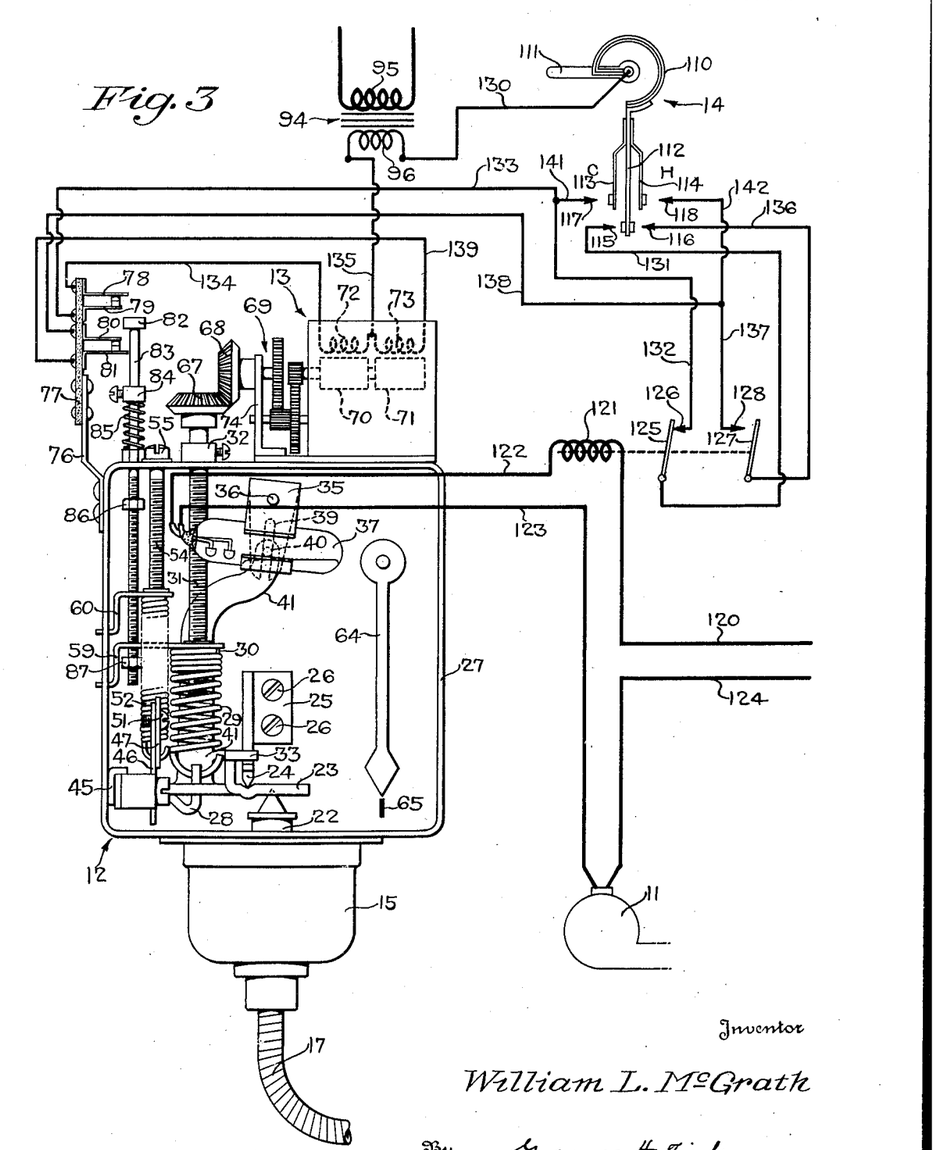
Figure 3 is a diagrammatic illustration of another form of my invention.

Referring now to Figure 3, I have shown a modified form of my invention, which utilizes the same heating system, including the oil burner 11, the same boiler thermostat 12, the same adjusting motor 13, and a space thermostat 14. The boiler thermostat 12 is in all respects similar to the boiler thermostat of Figure 1, with the exception that the mercury switch 38 is eliminated and the intermittent interruption of the adjusting motor is accomplished in a different manner, as will be pointed out more fully hereafter.

The space thermostat 14 of Figure 3 is shown to comprise a bimetallic element 110 suitably mounted on an adjusting lever 111. The bimetallic element 110 carries three switch arms 112, 113 and 114. The switch arm 112 is adapted to engage spaced contacts 115 and 116. The switch arm 113 is adapted to engage a contact 117, and the switch arm 114 is adapted to engage a contact 118. The contacts 117 and 118 are spaced apart farther than the contacts 115 and 116 so that greater temperature changes are required to make the contacts 117 and 118 than the contacts 115 and 116. The contacts 115 and 116 are used for the normal operation of the system. The functioning and operation of this thermostat will be pointed out more fully hereafter.

A wire 120 leading from a source of power, not shown, is connected to one end of a relay coil 121. The other end of the relay coil 121 is connected by a wire 122 to one of the electrodes of the mercury switch 37. The other electrode of the mercury switch 37 is connected by a wire 123 to the oil burner 11, which in turn is connected by a wire 124 to the source of power, not shown. Therefore, when the mercury switch 37 is moved to a circuit making position the oil burner 11 is placed in operation and the relay coil 121 is energized. Although, the oil burner 11 and relay coil 121 are shown to be connected in series, they may equally as well be connected in parallel. When the relay coil 121 is energized a switch arm 125 is moved out of engagement with a contact 126 and a switch arm 127 is moved into engagement with a contact 128. When the relay coil 121 is deenergized by reason of the movement of mercury switch 37 to a circuit breaking position, the switch arm 125 is moved into engagement with the contact 126 and the switch arm 127 is moved out of engagement with the contact 128, this latter movement of the switch arms 125 and 127 being accomplished by means of springs or gravity or other means, not shown.

Since the boiler thermostat 12 of Figure 3 is in all respects the same as that of Figure 2, it is seen that the oil burner 11 is intermittently operated to maintain the boiler water temperature at the desired value to supply the correct amount of heat to the space to be heated. Upon a decrease in space temperature as caused by an increase in the heating load the switch arm 112 is moved in the direction indicated by the character C into engagement with the contact 115 to complete a circuit from the secondary 96 through wire 130, bimetallic element 110, switch arm 112, contact 115, wire 131, switch arm 125, contact 126, wires 132 and 133, limit switch contacts 79 and 78, wire 134, field winding 72 and wire 135, back to the secondary 96 providing the oil burner 11 is off. This causes energization of the field winding 72 to increase the tension in the spring 29 to raise the setting of the boiler thermostat 12. This causes movement of the mercury switch 37 to a circuit making position to cause operation of the oil burner 11 and energization of the relay coil 121. Energization of the relay coil 121 moves a switch arm 125 out of engagement with the contact 126 to break the circuit through the field winding 72, whereby the upward adjustment of the boiler thermostat 12 is interrupted. Due to the operation of the oil burner 11 the temperature of the heating fluid is increased. Due to this increase in boiler water temperature the mercury switch 37 is moved to a circuit breaking position and the oil burner 11 is de-energized and the relay coil 121 is likewise de-energized. If the space temperature is not restored to normal at this time and the switch arm 112 is still in engagement with the contact 115, the circuit through the field winding 72 is re-established to further increase the setting of the boiler thermostat 12. This mode of operation is repeated until such time as the space thermostat is satisfied.

If the space temperature should rise above the normal value, as caused by a decrease in the heating load, the switch arm 112 is moved into engagement with the contact 116. When the boiler thermostat moves the mercury switch 37 to a circuit making position in an effort to maintain the boiler water temperature at the desired value the relay coil 121 is energized to move the switch arm 127 into engagement with the contact 128. This causes completion of a circuit from the secondary 96 through wire 130, bimetallic element 110, switch arm 112, contact 116, wire 136, switch arm 127, contact 128, wires 137 and 138, limit switch contacts 80 and 81, wire 139, field winding 73 and wire 135, back to the secondary 96 providing the oil burner 11 is on. This causes energization of the field winding 73 to decrease the tension in the spring 29 and consequently lower the setting of the boiler thermostat 12. This causes movement of the mercury switch 37 to a circuit breaking position to stop operation of the oil burner 11 and to de-energize the relay coil 121, whereby the circuit through the field winding 73 is broken and the downward adjustment of the boiler thermostat 12 is interrupted. When the boiler water temperature decreases so as to move the switch arm 37 into circuit making position, which causes operation of the oil burner 11 and movement of the switch arm 127 into engagement with the contact 128, if the switch arm 112 of the space thermostat 14 is still in engagement with the contact 116 the circuit through the field winding 73 is again established to again lower the setting of the boiler thermostat 12. This latter mode of operation will continue until such time as the space temperature is restored to the normal value.

From the above it is seen that in this modification as in the previous modification I have provided a boiler thermostat for controlling the operation of the boiler, which boiler thermostat is adjusted in a step-by-step manner for maintaining the space temperature at the desired value regardless of changes in the heating load.

The adjustment of the boiler thermostat is so arranged in this modification that when the setting of the boiler thermostat is being raised to increase the boiler water temperature, the operation of the oil burner is intermittently interrupted and when being lowered to decrease the temperature of the boiler water, the oil burner is intermittently operated. These intermittent operations and interruptions have the effect of cushioning the raising or lowering of the boiler water temperature to prevent "overshooting" or "undershooting" of the space temperature. Therefore, in this modification as in the previous modification an interlocking action is established between the rate of temperature change in the boiler water and the rate of adjustment of the boiler thermostat so that neither will be changed more rapidly than the other.

If there should be a sudden change in the heating load of a substantial extent so as to alter the space temperature sufficiently to move the switch arm 113 into engagement with the contact 117 or to move the switch arm 114 into engagement with the contact 118, depending upon whether the space temperature increases or decreases, the adjusting motor 13 is energized rapidly to adjust the boiler thermostat. Specifically, if the space temperature should fall to a predetermined low value so as to cause movement of the switch arm 113 into engagement with the contact 117, a circuit is completed from the secondary 96 through wire 130, bimetallic element 110, switch arm 113, contact 117, wires 141 and 133, limit switch contacts 78 and 79, wire 134, field winding 72 and wire 135, back to the secondary 96. Completion of this circuit causes energization of the field winding 72 to raise the setting of the boiler thermostat, and since this circuit shunts the switch arm 125 and the contact 126, the boiler thermostat is freely adjusted in an upward direction to rapidly change the setting of the boiler thermostat whereby the boiler water temperature may be rapidly increased to quickly restore the space temperature to the desired value.

Likewise, upon a sudden and large decrease in the heating load so as to cause movement of the switch arm 114 into engagement with the contact 118 a circuit is completed from the secondary 96 through wire 130, bimetallic 110, switch arm 114, contact 118, wires 142 and 138, limit switch contacts 80 and 81, wire 139, field winding 73, and wire 135, back to the secondary 96. Completion of this circuit causes energization of the field winding 73, and since this circuit shunts the switch arm 127 and the contact 128, the boiler thermostat 12 is adjusted downwardly in a relatively rapid manner whereby the space temperature is decreased quickly to the desired value.

This portion of the invention finds particular utility during morning pickup periods after a night shut-down where rapid raising of the space temperature is desired, and during night shut-down periods immediately following a lowering of the space thermostat setting where stopping of oil burner operation is desired.

From the above it is seen that in this modification I have not only provided a novel means for intermittently adjusting a boiler thermostat in a step-by-step manner for maintaining a desired temperature value within a space, but have also provided means for rapidly adjusting a boiler thermostat to quickly restore the space temperature to the desired value.

Figures 4, 5, 6:
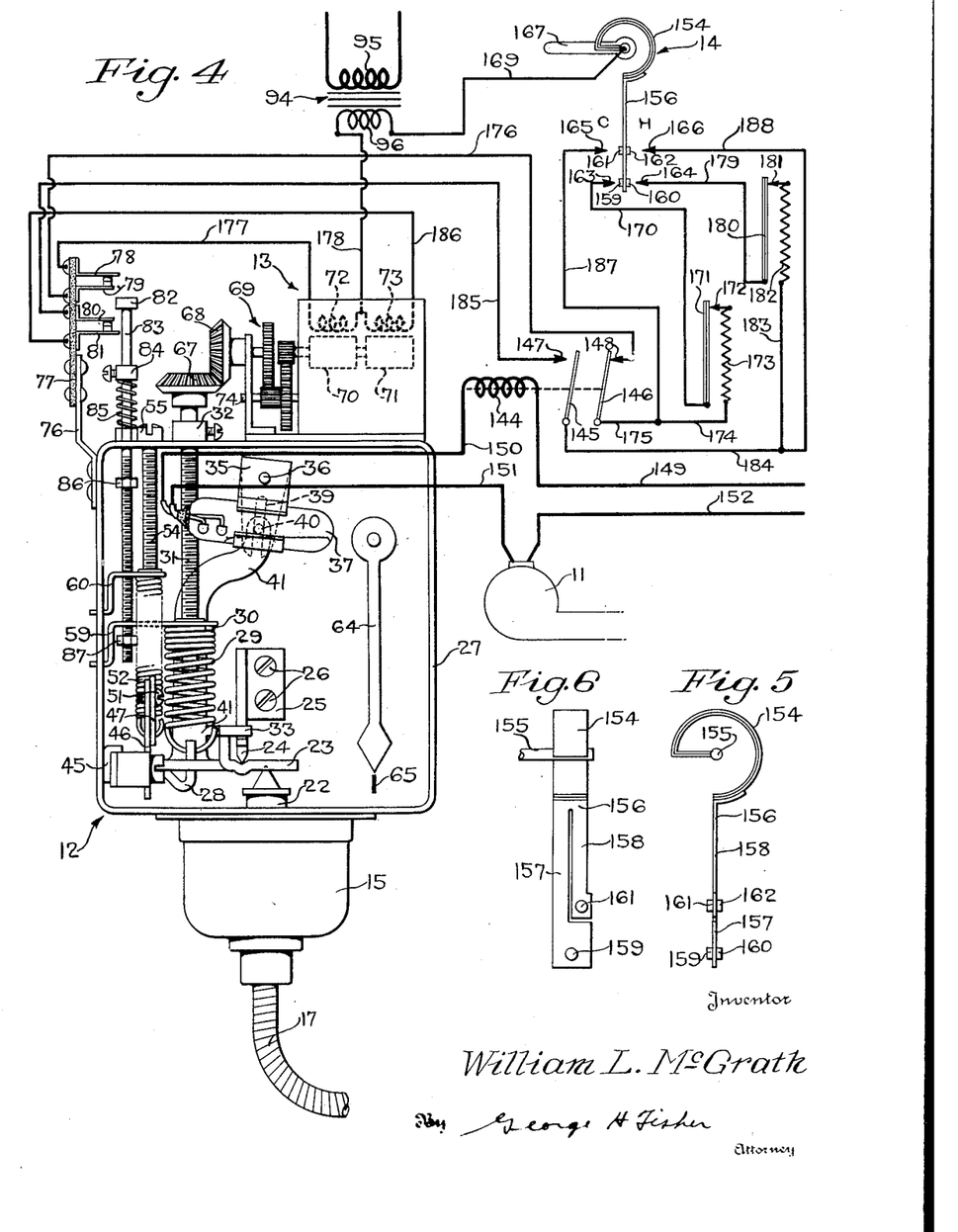
Figure 4 is a diagrammatic illustration of still another form of my invention.
Figures 5 and 6 are detail views showing the construction of a thermostat that may be utilized in the various modifications of my invention.

Referring now to Figure 4, I have shown an arrangement somewhat similar to that shown in Figure 3 for accomplishing substantially the same results, wherein there are utilized a boiler thermostat 12, an adjusting motor 13, a space thermostat 14, and a relay which are similar to those disclosed in Figure 3. The relay of Figure 4 is shown to comprise a relay coil 144 for operating switch arms 145 and 146, the arrangement being such that upon energization of the relay coil 144 the switch arm 145 is moved into engagement with a contact 147 and the switch arm 146 is moved out of engagement with a contact 148. Upon deenergization of the relay coil 144 the switch arm 145 is moved out of engagement with the contact 147 and the switch arm 146 is moved into engagement with the contact 148. A wire 149 leading from some source of power, not shown, is connected to one end of the relay coil 144 and the other end is connected by a wire 150 to one of the electrodes of the mercury switch 37. The other end of the mercury switch 37 is connected by wire 151 to the oil burner 11 which in turn is connected by wire 152 to the source of power. Therefore, when the mercury switch 37 is moved to a circuit making position the oil burner 11 is placed in operation and the relay coil 144 is energized. The burner 11 and the relay coil 144 may equally as well be connected in parallel.

The space thermostat 14 utilized in this modification is illustrated in detail in Figures 5 and 6 and may comprise a bimetallic element 154 mounted upon a post 155 and carrying a blade 156. The blade 156 is split longitudinally to form two blades 157 and 158, blade 157 carrying contacts 159 and 160 and blade 158 carrying contacts 161 and 162. Upon a decrease in space temperature the blade 156 is moved in the direction indicated by the character C and the contact 159 is moved into engagement with a contact 163, and upon a further decrease in space temperature the contact 161 is moved into engagement with a contact 165, this additional movement being permitted by the flexibility of the blade 156. Likewise, upon an increase in space temperature the contact 160 is moved into engagement with a contact 164, and upon a further increase in space temperature the contact 162 is moved into engagement with a contact 166.

As in the previous modifications, the boiler thermostat operates the mercury switch 37 to operate the oil burner 11 to maintain the temperature of the boiler water at the desired value to supply the correct amount of heat to the space to maintain the space temperature at the desired value. Upon a decrease in space temperature, as caused by an increase in the heating load, the contact 159 is moved into engagement with the contact 163 to complete a circuit from the secondary 96 through wire 169, bimetallic element 154, blade 156, contact 159, contact 163, wire 170, a bimetallic element 171, a contact 172 engaged by the bimetallic 171, a heater 173, wires 174 and 175, switch arm 146, contact 148, wire 176, limit switch contacts 79 and 78, wire 177, field winding 72 and wire 178, back to the secondary 96. Completion of this circuit causes energization of the field winding 72 to raise the setting of the boiler thermostat 12 in the manner pointed out previously with respect to Figure 3. The raising of the boiler thermostat setting is interrupted by means of the switch arm 146, breaking engagement with the contact 148 in the manner pointed out with respect to Figure 3. The raising of the setting of the boiler thermostat is further interrupted by means of the thermo-electric mechanism comprising the bimetallic element 171, the contact 172 and the heater 173. This interruption is caused by energization of the heater 173 which causes flexing of the bimetallic element 171 out of engagement with the contact 172. In this manner the adjustment of the boiler thermostat is materially retarded.

If the space temperature should increase so as to move the contact 160 into engagement with the contact 164 a circuit is completed from the secondary 96 through wire 169, bimetallic element 154, blade 156, contacts 160 and 164, wire 179, bimetallic element 180, contact 181, heater 182, wires 183 and 184, switch arm 145, contact 147, wire 185, limit switch contacts 80 and 81, wire 186, field winding 73 and wire 178, back to the secondary 96. Completion of this circuit causes energization of the field winding 73 to lower the setting of the boiler thermostat 12. The lowering of the setting of the boiler thermostat 12 is interrupted by the action of the switch arm 145 in the manner pointed out with respect to Figure 3. The lowering of the setting of the boiler thermostat is additionally retarded by the action of the thermo-electric mechanism comprising the bimetallic arm 180, the contact 181 and the heater 182. In this manner the rate of adjustment of the boiler thermostat 12 in a downward direction is likewise materially retarded.

If the space temperature should drop sufficiently far so as to cause engagement of the contacts 161 and 165, a shunt circuit is completed by the wire 187 around the thermo-electric device, whereby the boiler thermostat is adjusted upwardly more rapidly. Likewise, if the space temperature should rise sufficiently far so as to cause engagement between the contacts 162 and 166, a shunt circuit is completed around the other thermo-electric device to cause lowering of the setting of the boiler thermostat more rapidly. In both instances, however, in this modification the adjustment of the setting of the boiler thermostat, whether fast or slow, is in a step-by-step manner.

Although I have disclosed various combinations of features in the various modifications, the novel features of one modification may be incorporated with the novel features of another modification to accomplish desired results. Specifically, the means for rapidly adjusting the boiler temperature of Figures 3 and 4 upon a predetermined deviation of space temperature may be equally applied to Figure 1, and such a modification of Figure 1 is within the contemplation of this invention. The interrupting means comprising the thermo-electric devices of Figure 4 likewise may equally as well be provided in the modification shown by Figures 1 and 3.

From the above description of the various modifications of my invention it is seen that the oil burner is intermittently interrupted when the boiler water temperature is being increased in Figures 3 and 4, and is intermittently placed in operation when the boiler water temperature is being decreased in Figures 3 and 4. This may not be the case in the modification shown in Figure 1, since the oil burner may remain in operation during upward adjustment of the boiler thermostat or may remain out of operation during downward adjustment of the boiler thermostat. If it be desired to have the operation of the oil burner interrupted upon upward adjustment of the thermostat and intermittently operated upon downward adjustment of the boiler thermostat in Figure 1, a different type of mercury switch may be substituted for the mercury switch 38 of Figure 1. This mercury switch could comprise a pair of electrodes located in each end of the mercury switch, one of the pair of electrodes being adapted to be made when the mercury switch 37 is tilted to a circuit making position to place the oil burner in operation and the other pair of electrodes may be made when the mercury switch 37 is tilted to a position to stop operation of the oil burner. These pairs of electrodes respectively may function the same as the switch arm 127 and contact 128, and the switch arm 125 and contact 126, of Figure 3, and these pairs of electrodes may be connected to the field winding 72 and 73 of the adjusting motor 13 in the manner disclosed in Figure 3. This would give identical operation to that disclosed in Figures 3 and 4 and cause intermittent operation of the oil burner as the setting of the boiler thermostat is being raised, and cause intermittent operation of the oil burner as the setting of the boiler thermostat is being lowered.

From the above it is seen that I have provided a temperature control system wherein a condition responsive means, described as a boiler thermostat, is adjusted in a step-by-step manner in accordance with changes in the heating load to adjust the temperature of the heating means, described as a hot water boiler, to supply the correct amount of heat to the space to maintain the space temperature at the desired value regardless of changes in the heating load. In all instances the adjustment of the condition responsive means is interlocked with respect to the temperature of the heating fluid, so that the temperature of the heating fluid may not be changed faster than the adjustment of the condition responsive means, or that the condition responsive means may not be adjusted faster than the change in the temperature of the heating fluid. As pointed out above, the operation of the oil burner may be intermittently interrupted upon a raising of the adjustment of the condition responsive means, and the oil burner may be intermittently operated upon a lowering of the setting of the condition responsive means to provide a cushioning effect whereby "overshooting" and "undershooting" of the space temperature is prevented. Also by reason of my invention, provision is made for slowly adjusting the boiler thermostat when the temperature of the space deviates only slightly from normal and for rapidly adjusting the boiler thermostat when the temperature deviates a greater amount from normal.

Although for purposes of illustration I have disclosed various forms of my invention, other forms thereof may become apparent to those skilled in the art, and consequently this invention is to be limited only by the scope of the appended claims and prior art.

I claim as my invention:

1. In a system of the class described, the combination of heating means for a space, means responsive to the condition of the heating means for controlling said heating means, means responsive to space temperatures for adjusting said condition responsive means, and means responsive to the action of said condition responsive means for controlling the adjustment of said condition responsive means by said space temperature responsive means.

2. In a system of the class described, the combination of heating means for a space, means responsive to the condition of the heating means for controlling the heating means to maintain the condition of the heating means at given values, means responsive to the load on the heating system for adjusting the setting of the condition responsive means to maintain the condition of the heating means at a value which will supply the correct amount of heat to the space and maintain the space temperature at the desired value, and means responsive to the operation of the heating means for controlling the adjustment of the condition responsive means.

3. In a system of the class described, the combination of heating means for a space, means responsive to the condition of the heating means for intermittently energizing the heating means to maintain the condition of the heating means at given values, means responsive to space temperatures for adjusting the setting of the condition responsive means to maintain the condition of the heating means at a value which will supply the correct amount of heat to the space to maintain the space temperature at the desired value, and means operative upon energization of the heating means for interrupting the adjustment of said condition responsive means by said space temperature responsive means.

4. In a system of the class described, the combination of heating means for supplying heating fluid to a space, means responsive to the condition of the heating fluid for controlling said heating means, means responsive to space temperatures for adjusting said condition responsive means, means operative upon slight deviation in space temperature for controlling the adjustment of said condition responsive means by said space temperature responsive means, and means for preventing operation of said last mentioned controlling means when the space temperature deviates from normal a substantial amount.

5. In a system of the class described, the combination of heating means for a space, means responsive to the condition of the heating means for controlling the heating means to maintain the condition of the heating means at given values, means responsive to the load on the heating system for adjusting the setting of the condition responsive means to maintain the condition of the heating means at a value which will supply the correct amount of heat to the space and maintain the space temperature at the desired value, and means responsive to predetermined changes in the value of the condition of the heating means for controlling the adjustment of the condition responsive means when the load on the heating system changes a given amount but permitting free adjustment when the load on the heating system changes a greater amount.

6. In a system of the class described, the combination of heating means for a space, means responsive to the condition of the heating means for controlling the heating means to maintain the condition of the heating means at given values, means responsive to the load on the heating system for adjusting the setting of the condition responsive means to maintain the condition of the heating means at a value which will supply the correct amount of heat to the space and maintain the space temperature at the desired value, and means responsive to the operation of the heating means for retarding the adjustment of the condition responsive means when the load on the heating system changes a given amount but permitting free adjustment when the load on the heating system changes a greater amount.

7. In a system of the class described, the combination of heating means for supplying heating fluid to a space, means responsive to the condition of the heating fluid for controlling the heating means, means responsive to predetermined changes in space temperature for adjusting said condition responsive means at one rate, and means responsive to predetermined greater changes in space temperature for adjusting said condition responsive means at another rate.

8. In a system of the class described, the combination of heating means for a space, electrically operated firing means for said heating means, means responsive to the condition of said heating means, switching means operated by said condition responsive means, electrical connections between said switching means and said firing means, a space thermostat, adjusting means for said condition responsive means, electrical connections between said thermostat and said adjusting means, and switching mechanism operated by said condition responsive means in said last mentioned electrical connections to retard the adjustment of said condition responsive means.

9. In a system of the class described, the combination of heating means for a space, electrically operated firing means for said heating means, means responsive to the condition of said heating means, switching means operated by said condition responsive means, electrical connections between said switching means and said firing means, a space thermostat, adjusting means for said condition responsive means, electrical connections between said thermostat and said adjusting means, a relay coil in said first mentioned electrical connections, and switching mechanism in said second mentioned electrical connections operated by said relay coil for retarding the adjustment of said condition responsive means.

10. In a system of the class described, the combination of heating means for a space, electrically operated firing means for said heating means, means responsive to the condition of said heating means, switching means operated by said condition responsive means, electrical connections between said switching means and said firing means, a space thermostat, adjusting means for said condition responsive means, electrical connections between said thermostat and said adjusting means, switching mechanism in said last mentioned electrical connections to retard the adjustment of said condition responsive means, and other electrical connections between said thermostat and said adjusting means adapted to shunt said last mentioned switching mechanism.

11. In a system of the class described, the combination of heating means for a space, electrically operated firing means for said heating means, means responsive to the condition of said heating means, switching means operated by said condition responsive means, electrical connections between said switching means and said firing means, a space thermostat, adjusting means for said condition responsive means, electrical connections between said thermostat and said adjusting means, switching mechanism in said last mentioned electrical connections for controlling the adjustment of said condition responsive means, and other switching mechanism in said last mentioned electrical connections for limiting the adjustment of said condition responsive means.

WILLIAM L. McGRATH.